US012488948B2

(12) United States Patent
Kilsdonk et al.

(10) Patent No.: US 12,488,948 B2
(45) Date of Patent: Dec. 2, 2025

(54) LATCH BOLT AND STRIKE PLATE WITH ELECTRICAL CONDUCTOR

(71) Applicant: Sargent Manufacturing Company, New Haven, CT (US)

(72) Inventors: Daniel Kilsdonk, Westford, MA (US); Patrick Ryan, Shrewsbury, MA (US)

(73) Assignee: Sargent Manufacturing Company, New Haven, CT (US)

( * ) Notice: Subject to any disclaimer, the term of this patent is extended or adjusted under 35 U.S.C. 154(b) by 239 days.

(21) Appl. No.: 18/490,339

(22) Filed: Oct. 19, 2023

(65) Prior Publication Data

US 2024/0145184 A1 May 2, 2024

Related U.S. Application Data

(60) Provisional application No. 63/420,125, filed on Oct. 28, 2022.

(51) Int. Cl.
*H01H 3/16* (2006.01)
*E05B 17/22* (2006.01)
*H01H 1/44* (2006.01)

(52) U.S. Cl.
CPC ............. *H01H 3/163* (2013.01); *E05B 17/22* (2013.01); *H01H 1/44* (2013.01); *H01H 2003/165* (2013.01)

(58) Field of Classification Search
CPC ............. Y10T 70/5226; Y10T 70/5372; Y10T 70/5155; Y10T 70/5246; Y10T 70/7051; Y10T 70/70; Y10T 70/7062; Y10T 292/096; Y10T 292/1014; Y10T 292/0945; Y10T 292/79; Y10T 292/62; Y10T 292/68; Y10T 29/49018; E05B 47/0046; E05B 47/02; E05B 47/026; E05B 47/0696; E05B 17/00; E05B 17/22; E05B 17/226; E05B 45/00; E05B 45/06; E05B 45/065; E05B 45/0665; E05B 45/0695; E05B 45/12; E05B 45/083; E05B 15/02; E05B 15/0205; E05B 51/00; E05B 55/00; E05B 55/005; E05B 49/00; E05B 47/00; E05B 47/0001; E05B 47/0002; E05B 47/0047; E05B 47/06; E05B 47/0611; E05B 47/0657; E05B 47/0615; E05B 2047/0013; E05B 2047/0014; E05B 2047/0036; E05B 2047/0048; E05B 2047/005; E05B 2047/0054; E05B 2047/0052; E05B 2047/0071; E05B 2047/0072; E05B 2047/0079; E05B 2047/0084; H01H 3/16; H01H 3/163; E05C 9/1808; E05C 15/02; E05C 15/0205
USPC ........................................................ 200/61.68
See application file for complete search history.

(56) References Cited

U.S. PATENT DOCUMENTS

| | | | | |
|---|---|---|---|---|
| 2017/0362856 | A1* | 12/2017 | Almomani .............. | E05B 47/00 |
| 2019/0301199 | A1* | 10/2019 | Andersen ............ | E05B 47/0011 |

* cited by examiner

*Primary Examiner* — Anthony R Jimenez
(74) *Attorney, Agent, or Firm* — Wolf, Greenfield & Sacks, P.C.

(57) ABSTRACT

A door latch includes a latch bolt and strike plate capable of transferring electricity therebetween. The latch bolt and strike plate may each include one or more complementary electrical leads such that electrical power and/or electrical signals may flow between the complementary electrical leads, when the electrical leads are in contact with one another.

15 Claims, 12 Drawing Sheets

LATCH BOLT AND STRIKE PLATE WITH ELECTRICAL CONDUCTOR

CROSS-REFERENCE TO RELATED APPLICATIONS

This application claims the benefit under 35 U.S.C. § 119(e) to U.S. Provisional Application Ser. No. 63/420,125, entitled "LATCH BOLT AND STRIKE PLATE WITH ELECTRICAL CONDUCTOR" and filed Oct. 28, 2022, which is herein incorporated by reference in its entirety.

FIELD

Disclosed embodiments relate to door latches, and more particularly to latch bolts and strike plates having electrical conductors, for example to power electrical features of a door, the door frame and/or a door lock or to source power to other devices from the door, the door frame and/or the door lock at times of power need, such as, for example, during a power outage.

BACKGROUND

Conventional doors may include one or more electronic devices (e.g., electronic latching mechanisms, electronic locks, cameras, sensors, card readers, indicators, etc.). Accordingly, the electronic devices may function using external power and/or electrical signals. Typical doors equipped with such electronic devices may employ external power sources and/or controllers to operate the electronic devices.

SUMMARY

According to one aspect, a latch bolt assembly for use with a strike plate is provided. The latch bolt assembly includes a latch bolt configured to transition between an open position and a closed position. In the open position, the latch bolt is disengaged from the strike plate and, in the closed position, the latch bolt is engaged within the strike plate. At least one latch bolt electrical lead is disposed on the latch bolt and positioned such that the at least one latch bolt electrical lead establishes an electrical connection with at least one complementary strike plate electrical lead disposed on the strike plate when the latch bolt is in the closed position.

According to another aspect, a strike plate for use with a latch bolt assembly is provided. The strike plate includes a strike plate body, an opening disposed in the strike plate body and configured to accept a latch bolt of the latch bolt assembly, and a tab disposed at the opening. At least one strike plate electrical lead is disposed on the tab and positioned such that the at least one strike plate electrical lead establishes an electrical connection with at least one complementary latch bolt electrical lead disposed on the latch bolt when the latch bolt is within the opening.

According to yet another aspect, a door latch is provided. The door latch includes a latch bolt assembly configured to be attached to a door. The latch bolt assembly includes a latch bolt. A strike plate is configured to be attached to a door frame. The strike plate includes a strike plate body, an opening disposed in the strike plate body and configured to accept the latch bolt, and a tab disposed at the opening. The latch bolt is configured to transition between an open position and a closed position. The latch bolt is configured to be within the opening when the latch bolt is in the closed position. At least one latch bolt electrical lead is disposed on the latch bolt and at least one complementary strike plate electrical lead disposed on the tab. The at least one latch bolt electrical lead establishes an electrical connection with at least one complementary strike plate electrical lead when the latch bolt is within the opening.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures.

DETAILED DESCRIPTION

Figure 1A:
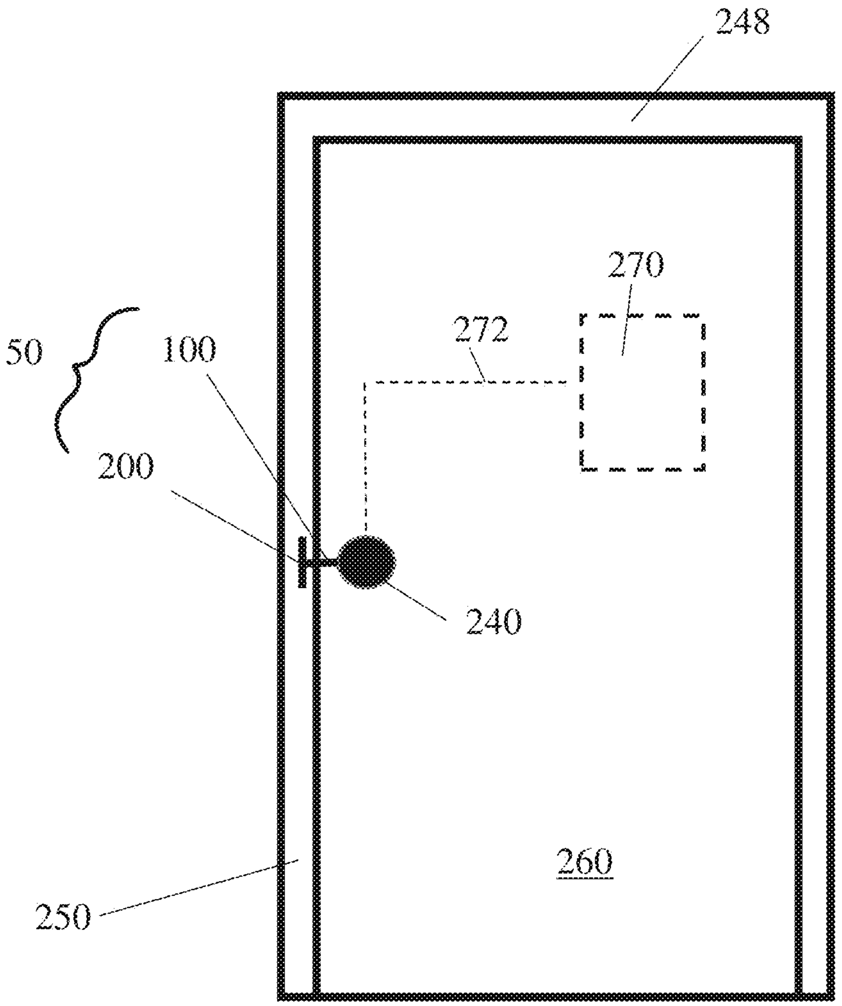
FIG. 1A is a schematic front view of a door mounted in a door frame and having a door latch with a latch bolt assembly and strike plate according to one illustrative embodiment.

Conventional doors may include one or more electronic devices (e.g., electronic latching mechanisms, electronic locks, cameras, sensors, card readers, indicators, etc.), which may function using electric power and/or electrical signals. Accordingly, such a conventional door may include one or more power sources (e.g., batteries, etc.) and/or one or more signal processing devices (e.g., processors, sensors, controllers, etc.). However, doors equipped with such devices may be expensive and complex to install and/or maintain. For example, additional holes may need to be bored through the door to accommodate the power sources and/or signal processing devices. Additionally, the power sources may need to be replaced on a regular basis to allow for continued use of the electronic devices. Thus, conventional techniques for providing power and/or electrical signal processing may result in needs for additional preparation and/or maintenance. Devices from the door, the door frame and/or the door lock may be a power source at times of power need, such as, for example, during a power outage.

In view of the above, the Inventors have recognized the advantages of a door including a structure for accommodating electrical power and/or electrical signal processing into or out from a door in a less intrusive and/or easier to maintain manner. For example, a door latch may include electrical leads such that electrical power and/or electrical signals may flow when the electrical leads complete a circuit. The door latch may include a latch bolt and strike plate, with each including one or more complementary electrical leads such that electrical power and/or electrical signals may flow between the complementary electrical leads, when the electrical leads are in contact with one another. The door latch may be part of a door lock (such as a bored/cylindrical lock, a mortise lock, a deadbolt lock, and exit device, etc.), though the door latch need not be associated with a lock per se. The door latch may include a latch bolt having one or more latch bolt electrical leads. A strike plate may have one or more complementary strike plate electrical leads. When the latch bolt and the strike plate are engaged with one another, electricity may flow between the one or more latch bolt electrical leads and the one or more complementary strike plate electrical leads.

Particularly, in some embodiments, a door latch according to the present disclosure includes a latch bolt having one or more latch bolt electrical leads disposed thereon. The latch bolt may further be configured to transition between an open position and a closed position relative to a strike plate such that in the open position the latch bolt is disengaged from the strike plate and in the closed position, the latch bolt is engaged with the strike plate. In turn, the strike plate may include one or more complementary strike plate electrical leads (e.g., complementary to the latch bolt electrical leads) disposed thereon such that when the latch bolt is in the closed position, the one or more latch bolt electrical leads come into contact with the one or more complementary strike plate electrical leads, thus closing an electrical circuit and establishing an electrical conductivity path (e.g., the flow of electricity) between the latch bolt electrical leads and the strike plate electrical leads.

Correspondingly, in some embodiments, a strike plate according to the present disclosure includes strike plate body having an opening and a tab disposed therein. The opening may be sized and/or shaped to accept the complementary latch bolt. Additionally, the tab may include one or more strike plate electrical leads disposed thereon. In turn, the latch bolt may include one or more complementary latch bolt electrical leads such that the latch bolt electrical leads and the strike plate electrical leads contact one another when the latch bolt is disposed within the opening (e.g., in the closed position described herein). Accordingly, when the latch bolt electrical leads and the strike plate electrical leads are in contact, an electrical circuit is closed thus establishing an electrical conductivity path (e.g., the flow of electricity) between the latch bolt electrical leads and the strike plate electrical leads. Of course, when the latch bolt electrical leads and the strike plate electrical leads are not in contact with one another (i.e., when the latch bolt is not disposed within the opening of the strike plate body), then no electrical conductivity path exists between the latch bolt electrical leads and the strike plate electrical leads. As will be briefly described below, it should be appreciated that certain safeguards should be employed so as to reduce the possibility of an electrical shock to a user when the latch bolt is not disposed within the opening and the strike plate electrical leads are otherwise exposed.

As will be appreciated by one of skill in the art, the arrangements for establishing electrical contact described herein may be employed with any kind of suitable door lock such as a bored/cylindrical lock, a mortise lock, a deadbolt lock or an exit device or even for door latching arrangements that do not employ a lock per se. Thus, it should be appreciated that although the various embodiments herein are described with respect to a conventional or conventionally positioned door latch, the present disclosure is not so limited and the door latch can be configured, for example, as a latch bolt, a deadbolt, or a vertical rod. Further, though embodiments described herein include a user deployable actuator arrangement such as a door handle or door knob or push bar to actuate the latch bolt (or deadbolt or vertical rod, etc.), it should be appreciated that no such user deployable actuator need be employed. In this regard, the latch bolt (or deadbolt or vertical rod, etc.) may be driven by a motor (or some other motive arrangement) upon presenting a credential at or near the door. Such a credential may be a key fob, an RFID card or dongle or may be a biometric code (face image, fingerprint scan, retina scan, etc.), as the present disclosure is not limited in this regard.

The latch bolt electrical leads and/or strike plate electrical leads may each be connected to one or more corresponding wires, solder paths or connectors. In turn, these conductors may be connected to one or more electronic devices external to the latching arrangement. For example, in some embodiments, the strike plate electrical leads are connected to a DC power source, while the latch bolt electrical leads may be connected to an ancillary power source configured to retain electrical power (e.g., a rechargeable battery and/or a supercapacitor), which may be mounted in the door. As will be appreciated by one of skill in the art, the ancillary power source may, in turn, be connected to additional electronic devices (e.g., cameras, electronic locks, electronic indicators, etc.) disposed in the door. Alternatively or in addition, the latch bolt electrical leads and/or strike plate electrical leads may serve to provide power out from the door.

In some embodiments, the latch bolt and/or strike plate may include features to facilitate contact between the latch bolt electrical leads and the strike plate electrical leads. For example, in some embodiments, the opening in the strike plate may be fitted to the profile of the latch bolt such that the latch bolt electrical leads disposed on the latch bolt remain aligned with the strike plate electrical leads disposed on the strike plate, within a predetermined tolerance. In some embodiments, the latch bolt electrical leads and/or the strike plate electrical leads may be capable of moving to improve the contact and/or alignment of the leads. In some embodiments, the leads may include springs and/or brushes that bias the electrical leads towards the mating electrical leads when the latch bolt is in the opening of the strike plate (e.g., when the door is closed). Alternatively or in addition, the latch bolt and/or the strike plate may include features that allow the latch bolt and strike plate to register with one another to accommodate tolerance imperfections in latch bolt/strike plate registration. The size and shape of the strike plate opening relative to the latch bolt may also act as a registration feature. As will also be appreciated by one of skill in the art, the complementary electrical leads may be biased towards one another in any suitable manner. In another example, in some embodiments, the strike plate electrical leads may be disposed in or on a spring-hinged surface of the strike plate such that the surface moves as the latch bolt is inserted into the strike plate opening, keeping pressure on the mating electrical leads. The spring-hinged surface may be the tab of the strike plate.

As described herein, complementary electrical leads may be considered to be in contact with one another when their respective centroids are offset from one another by less than or equal to a predetermined tolerance. In some embodiments, the predetermined tolerance may be about 0.15 inches, or about 0.2 inches, or about 0.25 inches. Other suitable tolerances are contemplated and therefore any suitable tolerance may be employed, depending on the application, as the disclosure is not so limited in this regard.

In some instances, it may be desirable to include features that reduce a sheer stress applied to the electrical conductors (e.g., the electrical leads and wires described herein), for example, when a latch bolt associated with the electrical conductors moves between an open and closed position. Particularly, it may be desirable to prevent or reduce the degree to which the electrical leads and/or wires of the electrical conductors rub or scrape against the latch bolt and/or the strike plate. Accordingly, the electrical leads disposed on the latch bolt may be located within a groove of the latch bolt. In some embodiments, the electrical conductors extend over (around) the edge of the latch bolt and fold therearound such that the impact with the strike plate limits the sheer forces witnessed by the conductors on the latch bolt. In one embodiment, as mentioned, the conductor strips are placed on the channels (grooves) and the channels wrap over the front of the latch bolt. The conductors, having been placed in the channels, therefore also extend around the edge of the latch bolt. The conductors may be insulated from the latch bolt, for example, with epoxy that holds the conductors to the latch bolt.

Alternatively or in addition, the wires connected to the leads may be surrounded by a sleeve, for example to protect the wires from stresses (e.g., when a latch bolt moves between an open and closed position). The sleeve may be made out of many different materials including, but not limited to PVC, metal, or plastic. The sleeve wall can be completely solid or a mesh of material. Additionally, the sleeve does not electrically interfere with the wires. If the wires are not insulated, then the sleeve may be made out of an insulating material or have an interior coating that insulates the wires.

The leads are electrically insulated from the latch bolt and/or the strike plate. For example, in some embodiments, the latch bolt and/or strike plate may be formed from electrically conductive materials (e.g., metals) capable of unintentionally tapping electricity from the leads. Thus, it would be desirable to insulate the conductors from the latch bolt and or strike plate. Accordingly, the latch bolt and/or strike plate may include one or more insulative materials positioned between the latch bolt and/or strike plate. Exemplary insulative materials may include rubber, glass, plastics, and/or any other suitable insulative material. In one embodiment, the epoxy or other adhesive that holds the conductors in place is electrically insulative. In one embodiment, the latch bolt and/or the strike plate may be formed of an insulating material, such as a plastic. As will be appreciated by one of skill in the art, the latch bolt and/or the strike plate may be insulated from the leads in any suitable manner, depending on the application, as the disclosure is not so limited in the regard.

In some embodiments, features to selectively cut power to the leads of the electrical conductors (e.g., as a user opens the door) may be employed. For example, when the electrical leads are not in contact with one another (e.g., when the latch bolt is in the open position where it is not engaged in the strike plate), electrical flow to each of the electrical leads is essentially an open circuit where no electricity may flow. Correspondingly, when the electrical leads are in contact with one another (e.g., when the latch bolt is in the closed position where the bolt is engaged in the strike plate), electrical flow to each of the electrical leads is essentially a closed circuit, allowing electricity to flow. A door position sensor may be used to prevent power on the strike plate and/or latch bolt conductors as a safety feature while the door is open.

It should be appreciated that in the embodiments described herein, latch bolt and/or strike plate may be a part of any suitable type of door lock. For example, in some embodiments, the latch bolt and/or strike plate may be a part of a rim/mortise type lock, while in other embodiments, the latch bolt and/or strike plate may be a part of an exit device having a push bar such as one employing a vertical rod type mechanism. Other types of locks are also contemplated, including cylinder/bored locks having a lever handle or knob arrangement, and deadbolts employing thumb turns, as well as fully motorized electronic locks. Of course, any suitable type of door lock or combination of door locks may be employed, as the disclosure is not so limited in this regard.

It should be appreciated that in the embodiments described herein, any suitable type of leads may be employed. For example, in some embodiments, the leads may correspond to electrical terminals, such as positive and/or negative terminals (e.g., to provide electrical power), while in other embodiments, leads may be configured to carry electrical signals. Of course, in further embodiments, the leads may be configured to send both electrical power and/or electrical signals, for example by facilitating known electronic standards (e.g., USB-A, USB-B, USB-B Mini, USB-B Micro, USB-C, Lightning, etc.), as well as POE and/or other suitable protocols. As will be appreciated by one of skill in the art, any suitable type of electric leads or combination of electrical leads may be employed, depending on the application.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1A is a schematic front view of a door 260 having a door latch 50. The door latch 50 includes a latch bolt assembly 100 and strike plate 200. In the embodiment in FIG. 1A, the door also includes a door lock set having a handle or door knob 240 with which the door latch 50, including door latch assembly 100 and strike plate 200, is a part. However, as described above, a door lock set need not be employed if it desirable to have a door without a locking feature, as is the case, for example, with a passive door knob/handle. For the sake of convenience, reference herein will be to a door lock or door lock set, though in some instances the concepts herein described can equally apply to a non-locking door knob/handle set. Continuing with FIG.

1A, the door sits in a frame 248 having a door jamb 250. In the embodiment shown, the door latch assembly 100 is connected to the door knob 240 and the strike plate 200 is connected to the door jamb. Of course, as described with respect to automatic deployment and retraction of the latch bolt etc., the door latch assembly 100 need not be operatively coupled to a door knob/handle. The door lock 240 may be an electronic lock or the door 260 may include any electronic device(s) 270 receiving power through the latching mechanism via electrical lines 272, as will become apparent below.

Figure 1B:
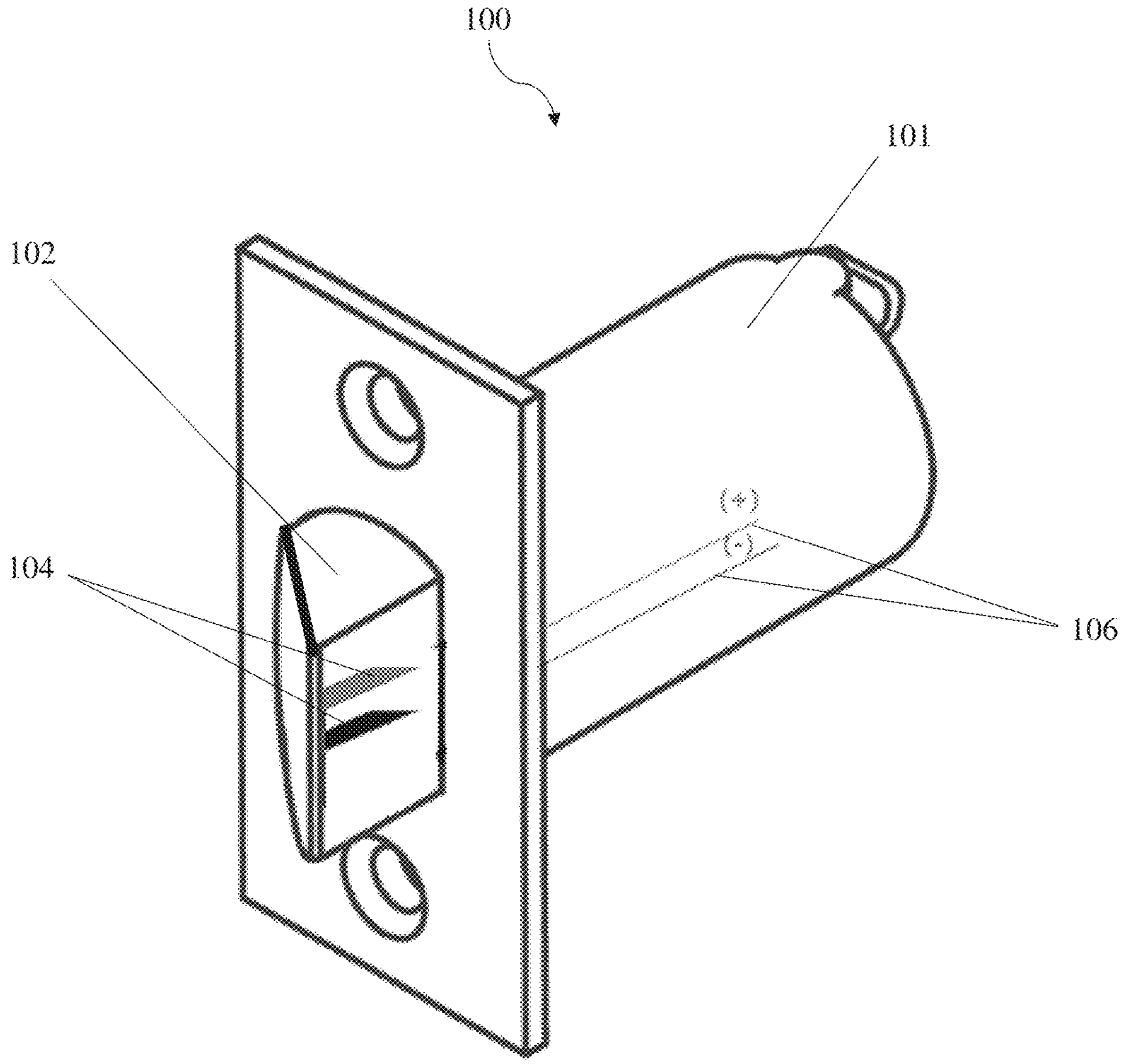
FIG. 1B is a perspective view of the latch bolt assembly of FIG. 1A having electrical conductors on a latch bolt according to one illustrative embodiment.

FIG. 1B is a perspective view of the door latch assembly 100 of the door latch 50 according to one illustrative embodiment. In the illustrated embodiment, the door latch assembly 100 includes a latch bolt housing 101, a latch bolt 102 biased within the latch bolt body, and two latch bolt electrical leads 104 disposed on the latch bolt 102. In turn, the latch bolt electrical leads 104 are electrically connected to two corresponding wires 106, which may be capable of electrically connecting the first electrical leads 104 to one or more power sources/consumers and/or external electronic devices (e.g., as described in greater detail herein). In one embodiment, the wires are run through channels (not shown) within the latch bolt, though other arrangements for positioning the wires relative to the latch bolt may be employed, as the present disclosure is not limited in this regard.

Figure 1C:
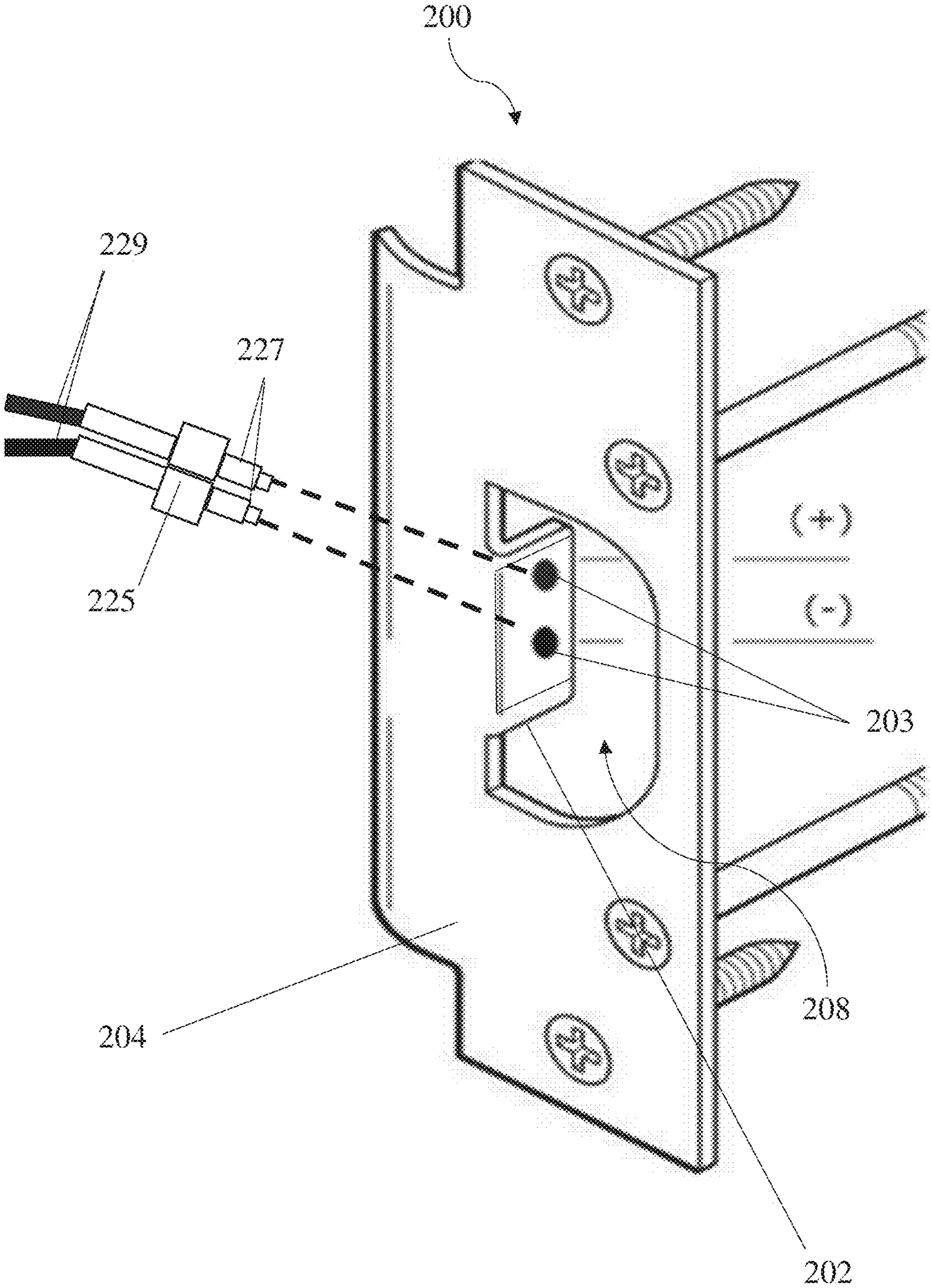
FIG. 1C is a perspective view of a strike plate of FIG. 1A having electrical conductors according to one illustrative embodiment.

Correspondingly, FIG. 1C is a perspective view of a strike plate 200 according to one illustrative embodiment. In the illustrated embodiment, the strike plate 200 includes a strike plate body 204, an opening 208 defined by the strike plate body and a tab 202 at an edge of the opening. Two strike plate electrical leads 203 are disposed on a strike plate body 204, and in this embodiment, on the tab 202. The strike plate electrical leads 203 are electrically connected to two corresponding wires 229 that connecting the strike plate electrical leads 203 to one or more power sources and/or external electronic devices (e.g., as described in greater detail herein), though as noted herein, power could originate from the door and in that case, power is sent from the door to electrical consumers via the strike plate electrical leads 203. The opening 208 is sized and/or shaped to accept a complementary latch bolt (e.g., the latch bolt 102 of FIG. 1A). Thus, the opening 208 may be capable of accepting and registering the latch bolt 102. Moreover, in the closed configuration (when the latch bolt is in the opening in the strike plate), the latch bolt electrical leads 104 are in contact with the strike plate electrical leads 203, thus establishing a closed circuit to allow electrical communication between the electrical leads 104, 203.

In some embodiments, the electrical leads 104, 203 may serve to transfer electrical power. Accordingly, in the embodiments illustrated in FIGS. 1A-1B, the latch bolt electrical leads 104 and the strike plate electrical leads 203 each is shown to include one positive and one negative lead, respectively. Thus, the positive lead of the latch bolt electrical leads 104 may be configured to contact the positive lead of the strike plate electrical leads 203. Correspondingly, the negative lead of the latch bolt electrical leads 104 may be configured to contact the negative lead of the strike plate electrical leads 203. Accordingly, when the electrical leads 104, 203 are so connected, an electrical circuit may be completed (closed circuit) allowing electrical power to flow through the electrical leads 104, 203. Alternatively or in addition, a multiplicity of electrical leads 104, 204 may be configured to transmit power and/or electrical signals (e.g., as described in greater detail herein).

Figure 2:
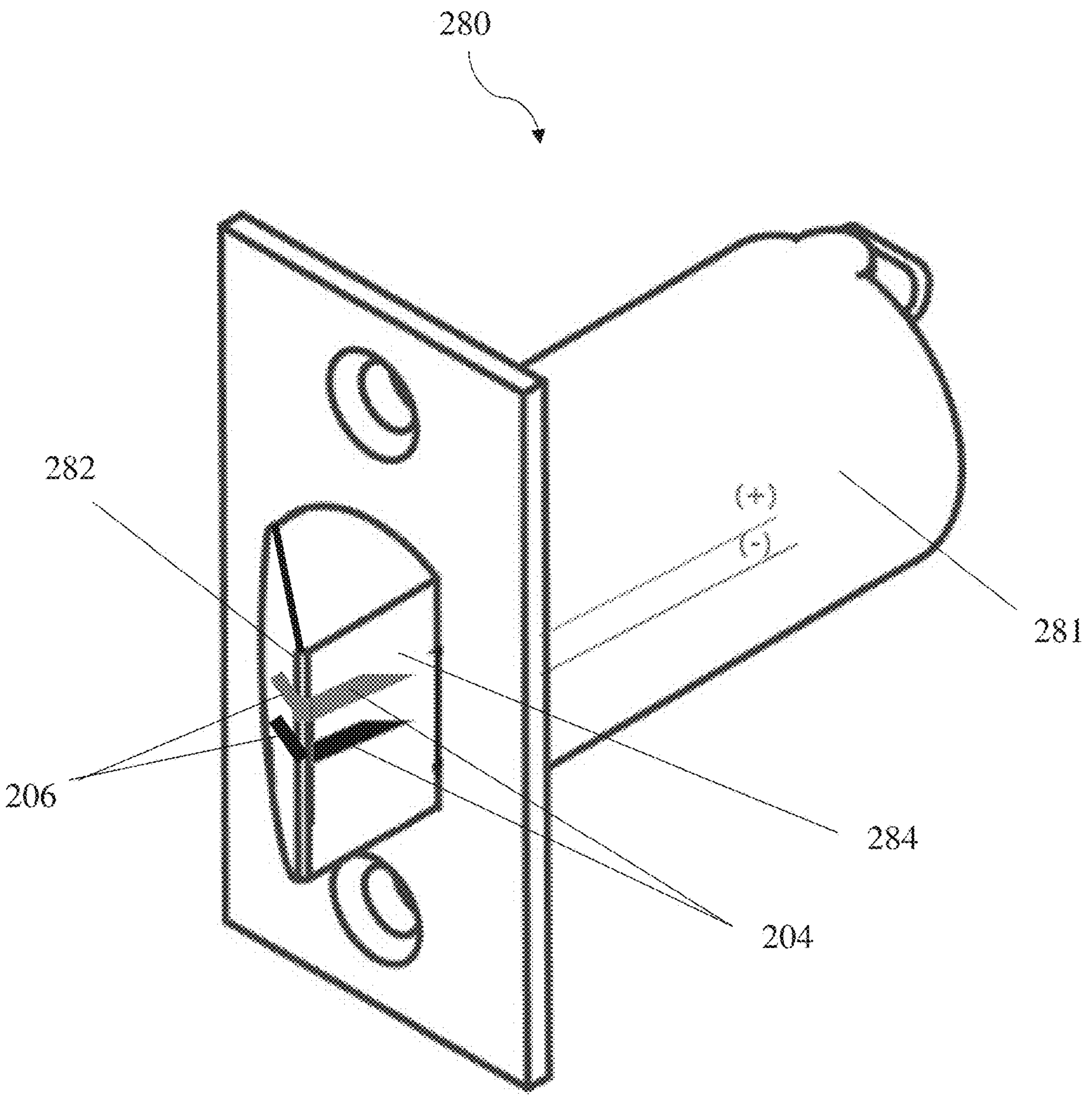
FIG. 2 is a perspective view of an alternative latch bolt assembly of FIG. 1B according to another illustrative embodiment.

FIG. 2 is an alternative view of a door latch assembly having a latch bolt housing 281 and latch bolt 284 biased within the housing. In this embodiment, door latch assembly 280 includes features to reduce the shear stress applied to latch bolt electrical leads 204. In this embodiment, the shear force may be accommodated by forming each latch bolt electrical lead 204 with a leading edge 206 in a manner to wrap around the edge 282 of the latch bolt 284. Thus, as the latch bolt 282 enters the strike plate opening, the leading edges 206 of the latch bolt electrical leads 204 do not impinge on the strike plate electrical leads as the latch bolt slides into the opening of the strike plate.

Figure 3:
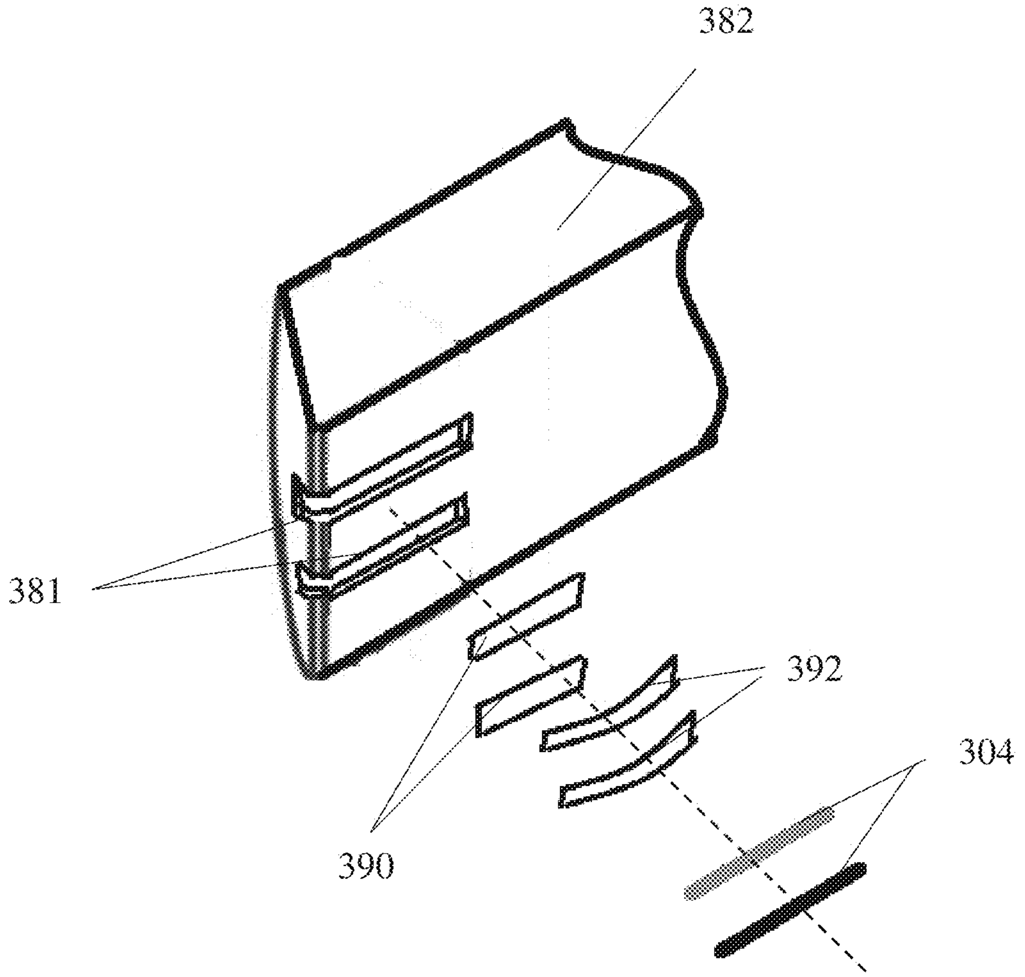
FIG. 3 is a perspective view of a latch bolt for the latch bolt assembly of FIG. 1B according to an illustrative embodiment.

FIG. 3 depicts another embodiment showing an exploded perspective view of a portion of a latch bolt 382. In this embodiment, latch bolt 382 is formed with grooves or channels 381 configured in size and shape to receive the latch bolt electrical leads 304. The latch bolt electrical leads are in turn coupled to respective wires (not shown) disposed in the latch bolt. As above, the grooves may wrap around the leading edge of the latch body to create a region to receive the leads in a manner whereby the shear force on the leads are reduced. Further, the grooves 381 may be configured such that a sidewall bordering the groove has a greater thickness than that of the electrical leads 304. FIG. 3 also depicts insulators 390 to insulate the conductive leads 304 from the conductive latch bolt in instances where the latch bolt is formed of a conductive metal. Further, as shown, leaf springs 392 may be employed to bias the latch bolt electrical leads 304 outward of the channels toward the strike plate electrical leads when the latch body is in the opening of the strike plate. The leaf springs may be formed of a conductive or non-conductive material. Alternatively, the latch bolt electrical leads themselves may be formed as a leaf spring so as to obviate the need for separate leaf springs. It should be appreciated that the leaf springs or latch bolt electrical leads biased toward the strike plate electrical leads allows for the latch bolt electrical leads to reliably contact the strike plate electrical leads.

Figure 4:
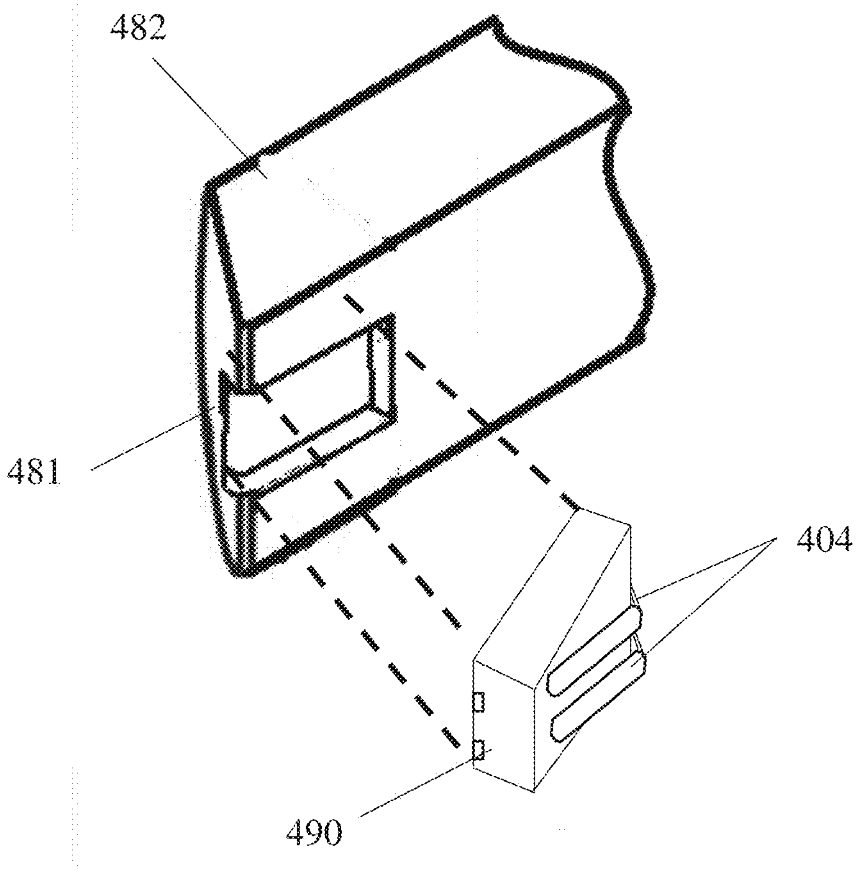
FIG. 4 is a perspective view of an alternative latch bolt for the latch bolt assembly of FIG. 1B according to another illustrative embodiment.

FIG. 4 depicts another embodiment showing an exploded perspective view of a portion of a latch 482 that is formed with a receptacle 481 configured in size and shape to receive a block 490 having the electrical leads 404. In this embodiment, the leads 404 are spring biased (formed as leaf springs or held in the lead block 490 with a separate spring (not shown)). As can be appreciated, the lead block is formed of an electrically insulating material and may be held in the receptable 481 via any suitable arrangement, such as with fasteners (screws) or adhesive, as the present disclosure is not limited in this respect. The electrical leads are in turn coupled to respective wires (not shown) disposed in the latch bolt.

Referring again to FIG. 1C, the strike plate electrical leads 203 may be incorporated into spring biased plunger block 225 having individual plungers 227. Wire conductors 229 are connected to the plungers 227. The plunger block 225 may be formed of an electrically insulating material and may be held in the tab 202 via any suitable arrangement, such as with fasteners (screws) or adhesive, as the present disclosure is not limited in this respect. In this embodiment, the tips of the plungers 227 define the strike plate electrical leads 203. In this respect, the tab 202 may be formed with insulated holes to accept the plungers or the tab may itself include a receptacle to hold the plunger block 225, as the present disclosure is not so limited.

Figure 5A:
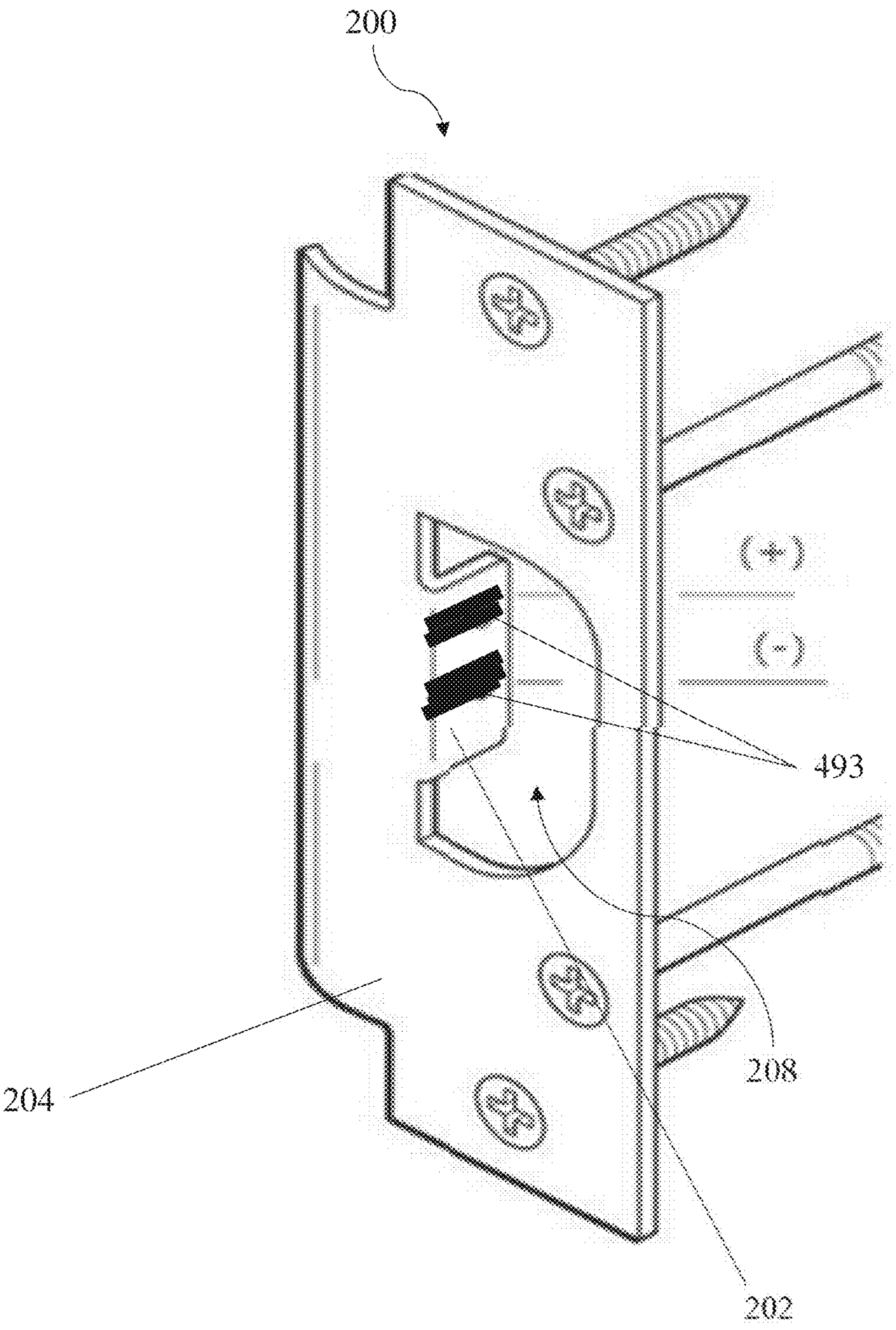
FIG. 5A is a perspective view of an alternative embodiment of the strike plate.
Figure 5B:
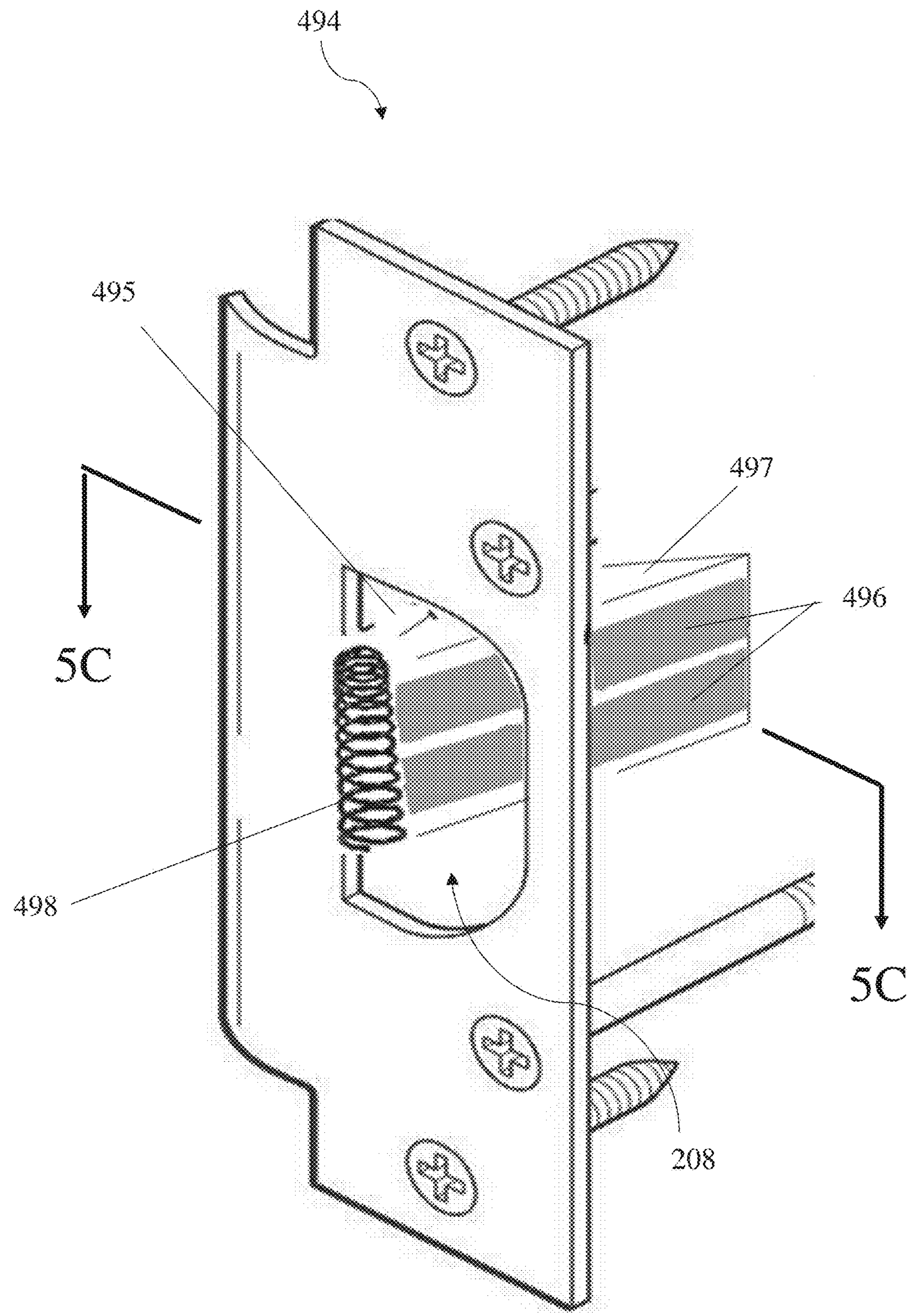
FIG. 5B is a perspective view of another alternative embodiment of the strike plate.
Figure 5C:
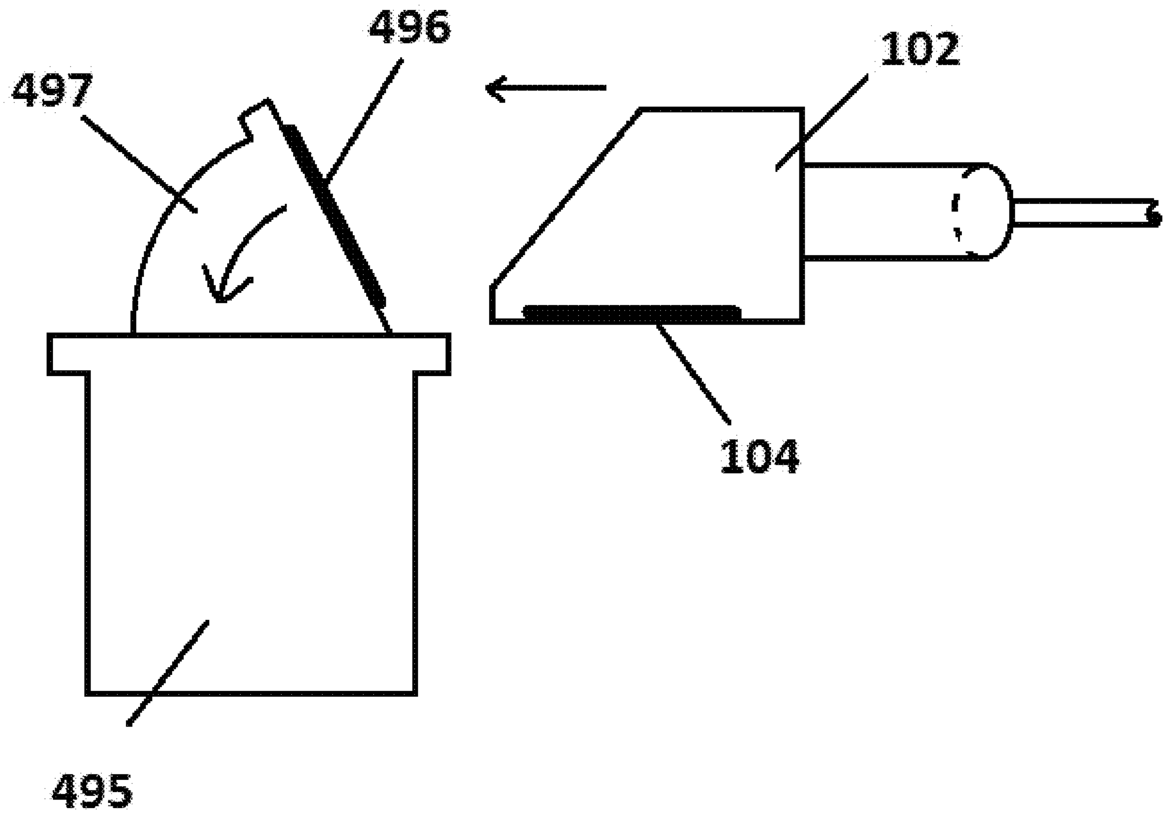
FIG. 5C is a schematic view taken along line 5C-5C of the strike plate of FIG. 5B.

FIGS. 5A-5C show schematic representations of alternative embodiments of the strike plate. In FIG. 5A, the strike plate 200 is similar to that described with reference to FIG.

1C, (including strike plate body 204, opening 208 defined by the strike plate body, and tab 202 at an edge of the opening) except that instead of employing spring biased plunger block 225 having individual plungers 227 that correspond to the strike plate electrical leads 203, the strike plate electrical leads 493 in this illustrated embodiment are formed as conductive traces 493 on the tab 202. Of course, the conductive traces are electrically insulated from the material of the tab in cases where the strike plate and/or strike plate tab is formed of a conductive material.

FIGS. 5B and 5C show strike plate 494 having a strike box 495. In this embodiment, the strike plate electrical leads 496 are disposed on a hinged tab 497. As shown, the tab 497 is biased toward the opening 208 via a spring 498 such that when the latch bolt (e.g., latch bolt 102) enters the opening, the latch bolt causes the tab 497 to rotate into or toward the strike box 495 and away from the opening 208. The spring-biased tab 497 presses against the latch bolt once the latch bolt is in the strike plate opening such that the strike plate electrical leads 496 can reliably contact the latch bolt electrical leads (e.g., latch bolt electrical leads 104).

Figure 6A:
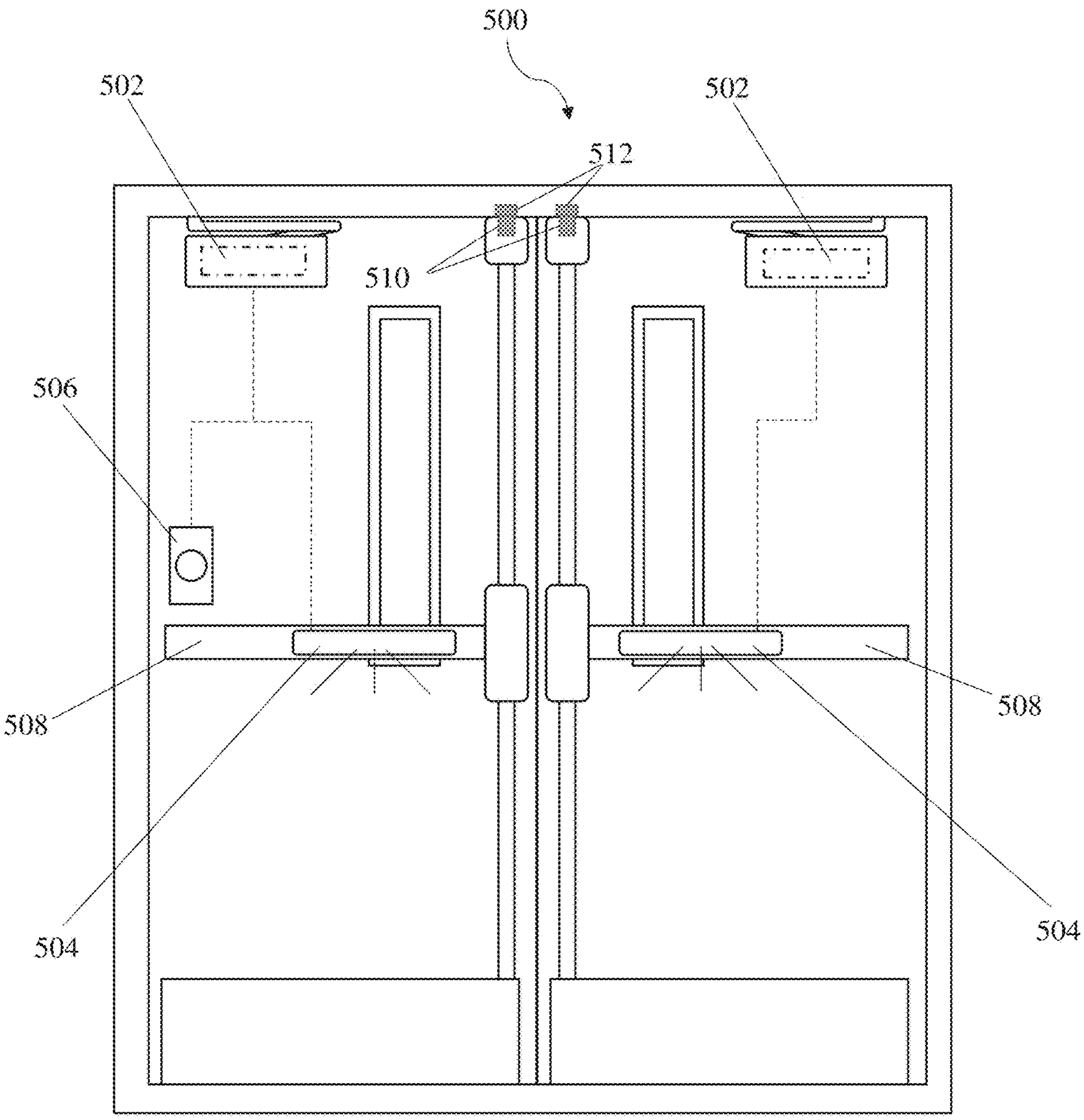
FIG. 6A is a schematic front view of a set of doors having a door latch according to another illustrative embodiment.
Figure 6B:
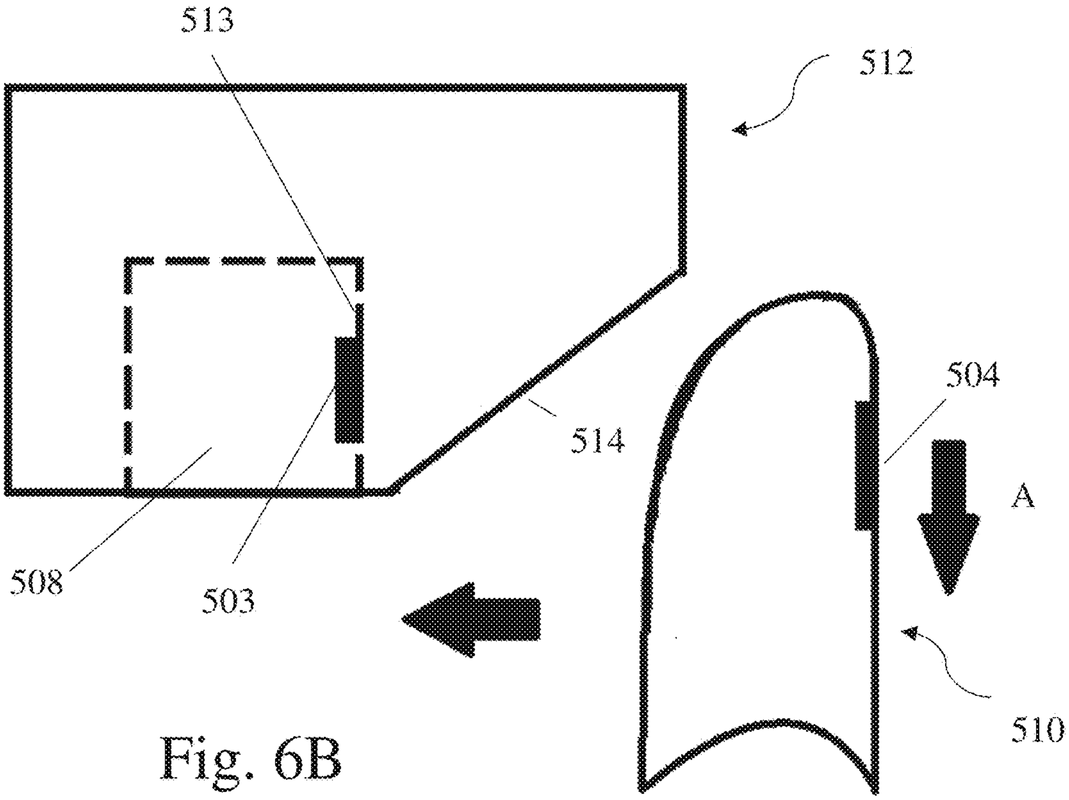
FIGS. 6B and 6C are schematic views of an illustrative embodiment of a latch bolt and strike plate of FIG. 6A; and, FIG. 7 is a schematic view of an illustrative embodiment of a latch bolt and strike plate in combination with a sensor.
Figure 6C:
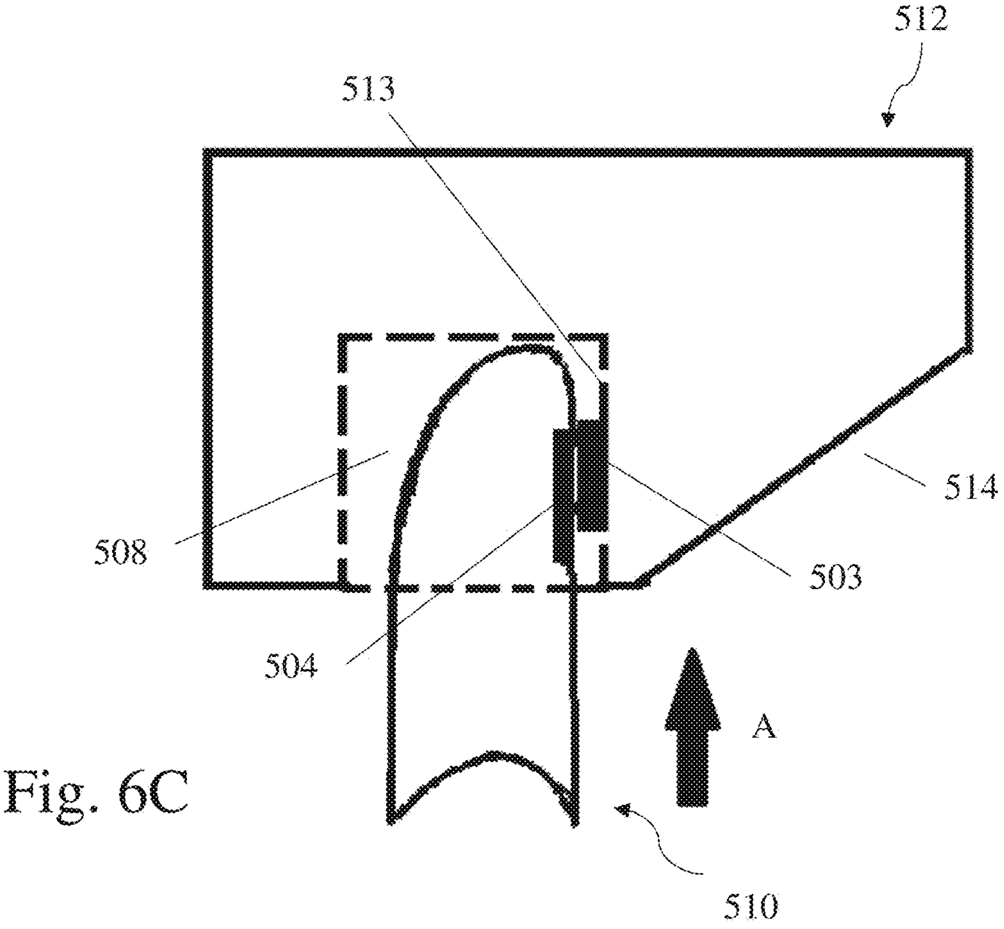

FIG. 6A is a schematic front view of a set of doors having an exit device with a vertical rod latching arrangement. In this embodiment, latching of the door occurs at the top of the door into the door frame where the latch bolt 510 moves vertically into the strike plate 512 to secure a door. In this embodiment, the strike plate 512 is located above the door. This vertical rod arrangement is common in exit devices and will be appreciated by one of skill in the art. Accordingly, the vertical rod includes a latch bolt 510 engaging within strike plate 512. In the embodiment of FIGS. 6B and 6C, the latch bolt 510 is shown engaging with the strike plate 512. Latch bolt electrical leads 504 are disposed on the latch bolt 510 and strike plate electrical leads 503 are disposed in the strike plate, in particular in the tab 513 of the strike plate body 514. Particularly, in FIG. 6A, the latch bolt 510 is shown moving downward along arrow A about to enter the opening 508 of the strike plate 512. Once the latch bolt 510 passes the edge of the opening 508, the latch bolt 510 can enter the opening 508 by moving in the opposite direction along arrow A, as shown in FIG. 6C, such that latch bolt electrical leads 504 make electrical contact with the strike plate electrical leads 503.

In FIG. 6, the door 500 is equipped with multiple electronic devices according to one illustrative embodiment. For example, push bar 508 of the exit device may electrical capabilities and/or may be electrically connected to multiple electronic devices. Particularly, the contact between the latch bolt electrical leads and the strike plate electrical leads may form an energy bridge, which may provide electrical power and/or electrical signals to or from electronic devices or power generators on the door. In some embodiments, power consumers in or on the door may include, for example, an indicator light 504 (e.g., to display a status of the door), rechargeable battery 502 and/or a camera 506. Examples of power sources or generators may include battery 502 (in the case of power out from the battery) or solar power generators (not shown) on the door. Examples of compatible electronic devices that are not shown include, but are not limited to, smart devices that interact with a wireless network, sounded alarms, RFID card readers, Bluetooth® receivers, sensors, or electronic displays. Such examples of power consumers and sources/generators may be included in any of the embodiments described herein, as the present disclosure is not so limited.

Figure 7:
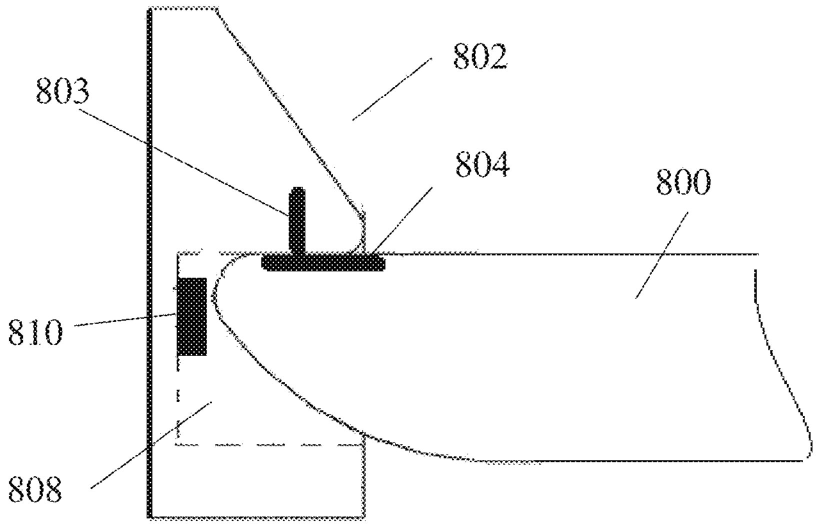

As shown in FIG. 7, which is a schematic view of another illustrative embodiment, a sensor 810 is disposed relative to the latch bolt 800 so as to sense the presence of the latch bolt 800 within the opening 808 of the strike plate 802. The sensor 810 may be positioned in any suitable location to detect the presence of the latch body 800 within the opening 808. In the embodiment shown, the sensor 810 is positioned in the opening 808, although other suitable locations may be employed. The sensor may be a proximity sensor or a contact sensor or any other suitable sensor that can detect the presence of the latch body 800 within the opening 808. When the latch bolt 800 is in the opening 808 of the strike plate 802, sensor 810 causes power/data to be switched on such that power and/or signals can be transmitted between latch bolt electrical leads 804 and strike plate electrical leads 803. thereby allowing for power and/or communication transfer.

It should be appreciated that any of the features described with respect to a figure may be used in various embodiments, such that the multiple features described above can be employed in any desired combination.

A latching mechanism with electrical capabilities according to the embodiments disclosed herein may be interconnected with electronic devices in any suitable manner.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A latch bolt assembly for use with a strike plate, the latch bolt assembly comprising:

a latch bolt configured to transition between an open position and a closed position, wherein, in the open position, the latch bolt is disengaged from the strike plate and, in the closed position, the latch bolt is engaged within the strike plate; and at least one latch bolt electrical lead disposed on the latch bolt and positioned such that the at least one latch bolt electrical lead establishes an electrical connection with at least one complementary strike plate electrical lead disposed on the strike plate when the latch bolt is in the closed position.

2. The latch bolt assembly of claim 1, wherein the latch bolt includes at least one groove configured to receive a corresponding at least one latch bolt electrical lead.

3. The latch bolt assembly of claim 1, further including an insulator disposed on the latch bolt and configured to insulate the at least one latch bolt electrical lead from the latch bolt.

4. The latch bolt assembly of claim 1, further including at least one spring cooperating with a corresponding at least one lath bolt electrical lead, the at least one spring configured to bias the corresponding at least one latch bolt electrical lead towards the at least one complementary strike plate electrical lead.

5. The latch bolt assembly of claim 1, in combination with a sensor cooperating with the latch bolt, the sensor configured to sense whether the latch bolt is in the open position or the closed position.

6. A strike plate for use with a latch bolt assembly, the strike plate comprising:

a strike plate body;

an opening disposed in the strike plate body and configured to accept a latch bolt of the latch bolt assembly;

a tab disposed at the opening; and at least one strike plate electrical lead disposed on the tab and positioned such that the at least one strike plate electrical lead establishes an electrical connection with at least one complementary latch bolt electrical lead disposed on the latch bolt when the latch bolt is within the opening.

7. The strike plate of claim 6, further including an insulator disposed on the tab and configured to insulate the at least one strike plate electrical lead from the strike plate.

8. The strike plate of claim 6, further including at least one spring cooperating with a corresponding at least one strike plate electrical lead, the at least one spring configured to bias the corresponding at least one strike plate electrical lead towards the at least one complementary latch bolt electrical lead.

9. The strike plate of claim 6, in combination with a sensor cooperating with the latch bolt, the sensor configured to sense whether the latch bolt is disposed within the opening.

10. A door latch comprising:

a latch bolt assembly configured to be attached to a door, the latch bolt assembly having a latch bolt;

a strike plate configured to be attached to a door frame, the strike plate having a strike plate body, an opening disposed in the strike plate body and configured to accept the latch bolt, and a tab disposed at the opening, wherein the latch bolt is configured to transition between an open position and a closed position, wherein the latch bolt is configured to be within the opening when the latch bolt is in the closed position; and at least one latch bolt electrical lead disposed on the latch bolt and at least one complementary strike plate electrical lead disposed on the tab, wherein the at least one latch bolt electrical lead establishes an electrical connection with at least one complementary strike plate electrical lead when the latch bolt is within the opening.

11. The door latch of claim 10, wherein the at least one latch bolt electrical lead and the at least one strike plate electrical lead are configured to transmit electrical power to one or more external electronic devices when the latch bolt is within the opening in the strike plate body.

12. The door latch of claim 11, wherein the at least one latch bolt electrical lead and the at least one strike plate electrical lead are configured to transmit electrical power to at least one of an ultracapacitor and a battery when the latch bolt is within the opening in the strike plate.

13. The door latch of claim 11, wherein the at least one latch bolt electrical lead and the at least one strike plate electrical lead are configured to transmit electrical power from at least one of an ultracapacitor and a battery when the latch bolt is within the opening in the strike plate.

14. The door latch of claim 10, wherein the at least one latch bolt electrical lead and the at least one strike plate electrical lead are configured to transmit one or more electrical signals to one or more electronic devices when the latch bolt is within the opening in the strike plate.

15. The door latch of claim 11, in combination with the door, the door latch being coupled to the door, wherein the door comprises a solar power generator and wherein the at least one latch bolt electrical lead and the at least one strike plate electrical lead are configured to transmit electrical power from the solar power generator when the latch bolt is within the opening in the strike plate.

* * * * *